United States Patent
van der Klooster et al.

(10) Patent No.: US 10,435,157 B2
(45) Date of Patent: Oct. 8, 2019

(54) HEADREST WITH INTEGRATED IN-FLIGHT ENTERTAINMENT SYSTEM

(71) Applicant: Safran Seats USA LLC, Gainesville, TX (US)

(72) Inventors: Kenzie van der Klooster, Denton, TX (US); Michael Parker, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 189 days.

(21) Appl. No.: 15/532,561

(22) PCT Filed: Dec. 2, 2015

(86) PCT No.: PCT/US2015/063410
§ 371 (c)(1),
(2) Date: Jun. 2, 2017

(87) PCT Pub. No.: WO2016/089985
PCT Pub. Date: Jun. 9, 2016

(65) Prior Publication Data
US 2017/0361933 A1 Dec. 21, 2017

Related U.S. Application Data

(60) Provisional application No. 62/086,418, filed on Dec. 2, 2014.

(51) Int. Cl.
*B64D 11/00* (2006.01)
*B60N 2/879* (2018.01)
(Continued)

(52) U.S. Cl.
CPC ........ *B64D 11/00153* (2014.12); *B60N 2/879* (2018.02); *B60R 11/0217* (2013.01);
(Continued)

(58) Field of Classification Search
CPC ..... B64D 11/00153; B60N 2/879; A47C 7/66; B60R 11/0229; B60R 11/0235
(Continued)

(56) References Cited

U.S. PATENT DOCUMENTS 3,922,034 A * 11/1975 Eggert ............... B64D 11/0689
297/216.12
4,027,915 A * 6/1977 Anderson ............... A47D 15/00
297/184.13
(Continued)

FOREIGN PATENT DOCUMENTS

| DE | 10213644 | 10/2003 |
|---|---|---|
| WO | 2003053735 | 7/2003 |
| WO | 2014186682 | 11/2014 |

OTHER PUBLICATIONS

International Patent Application No. PCT/US2015/063410, Search Report and Written Opinion, dated Mar. 23, 2016.

*Primary Examiner* — David R Dunn
*Assistant Examiner* — Tania Abraham
(74) *Attorney, Agent, or Firm* — Kilpatrick Townsend & Stockton LLP; Tiffany L. Williams; Dean W. Russell

(57) ABSTRACT

Described are headrests with integrated entertainment systems. The headrest includes a shell that is coupled to a seat through a headrest mount that has at least one degree of freedom of movement. The headrest shell also supports a visor with at least one side arm and a display span that may rotate between stowed and deployed positions. A neutral position mechanism supports the headrest in a neutral position and provides resistance to movement between the headrest and the passenger seat. The attachment of the visor to the headrest shell may also include an adjustment slot to allow fore and aft translation of the visor with respect to the headrest shell. The fore and aft translation of the visor allows for positioning the visor at different focal lengths, and
(Continued)

provides extra clearance for the visor as it moves between stowed and deployed positions.

20 Claims, 9 Drawing Sheets

(51) Int. Cl.
- *B60R 11/02* (2006.01)
- *G02B 27/01* (2006.01)
- *B60N 2/02* (2006.01)
- *B60R 11/00* (2006.01)

(52) U.S. Cl.
CPC ...... *B60R 11/0235* (2013.01); *G02B 27/0176* (2013.01); *B60N 2/0232* (2013.01); *B60R 2011/0017* (2013.01); *B60R 2011/0082* (2013.01); *G02B 2027/0154* (2013.01); *G02B 2027/0156* (2013.01)

(58) Field of Classification Search
USPC .................. 297/184.1, 184.11–184.13, 405
See application file for complete search history.

(56) References Cited

U.S. PATENT DOCUMENTS

| | | | | |
|---|---|---|---|---|
| 4,583,780 A * | 4/1986 | Finn | ........................ | A47D 15/00 24/332 |
| 4,883,315 A * | 11/1989 | Ferguson | ............. | B60N 2/2839 297/184.12 |
| 4,911,498 A * | 3/1990 | Becher | ..................... | A47C 7/66 297/184.12 |
| 5,000,511 A * | 3/1991 | Shichijo | ............. | B64D 11/0015 297/117 |
| 5,106,179 A * | 4/1992 | Kamaya | .................... | A61F 9/08 351/158 |
| 5,266,070 A * | 11/1993 | Hagiwara | ............. | A61M 21/00 600/27 |
| 5,624,156 A * | 4/1997 | Leal | ........................ | A47C 7/72 297/217.4 |
| 5,687,230 A * | 11/1997 | Olausson | ............ | B60R 11/0217 379/420.02 |
| 5,795,018 A * | 8/1998 | Schumacher | ...... | B64D 11/0015 244/118.5 |
| 5,844,530 A * | 12/1998 | Tosaki | ................. | G02B 27/017 345/8 |
| 5,984,415 A * | 11/1999 | Schumacher | ...... | B64D 11/0646 297/411.2 |
| 7,019,715 B1 * | 3/2006 | Kasai | ................... | G02B 27/0172 345/8 |
| 8,605,935 B1 * | 12/2013 | Huang | ................... | H04R 1/105 381/374 |
| 2005/0242641 A1 | 11/2005 | Thompson | | |
| 2007/0019297 A1 | 1/2007 | Stewart et al. | | |
| 2011/0156464 A1 * | 6/2011 | Izawa | ..................... | A47C 7/54 297/411.31 |
| 2013/0278027 A1 * | 10/2013 | Brucato | ................ | B60N 2/838 297/216.12 |
| 2013/0300176 A1 * | 11/2013 | Gabriel | .................. | B60N 2/286 297/391 |
| 2014/0043212 A1 | 2/2014 | Park et al. | | |
| 2015/0097759 A1 * | 4/2015 | Evans | .................... | H04R 1/028 345/8 |
| 2017/0327244 A1 * | 11/2017 | Blanvillain | ............... | B64F 1/30 |

* cited by examiner

HEADREST WITH INTEGRATED IN-FLIGHT ENTERTAINMENT SYSTEM

CROSS REFERENCE TO RELATED APPLICATIONS

This patent application is the U.S. national stage entry of PCT/US2015/063410 ("the '410 application"), filed on Dec. 2, 2015, which application is related to and claims priority benefits from U.S. Provisional Application Ser. No. 62/086,418 ("the '418 application"), filed on Dec. 2, 2014, entitled "Headrest with Incorporated In-Flight Entertainment". The '410 and '418 applications are hereby incorporated in their entireties by this reference.

FIELD OF THE INVENTION

The field of the invention relates to passenger seats or the like, and more particularly to headrests with integrated entertainment systems.

BACKGROUND

There has been continuous movement in carrier industries, particularly with air carriers, to seat passengers more closely to increase carrying capacity. To increase passenger carrying capacity, living space is becoming increasingly compact. In an effort to give passengers the most possible living space, seating structures are also becoming more compact to compensate for tighter seating arrangements. However, higher passenger capacity may lead to increased discomfort and stress for passengers from reduced living space.

Entertainment systems, and in the case of air carriers in-flight entertainment systems, may be used to distract or otherwise help passengers have a more pleasant travel experience in closely confined spaces. Current entertainment systems, though, may be compromised in that they may be a general entertainment system, where all passengers must watch or listen to one or a small number of works, or they provide a less than ideal experience because individual entertainment systems for each passenger are space constrained and may interfere with other passengers enjoyment of their own entertainment. In either case, traditional entertainment systems may not provide adequate relief to passengers from the stress of tightly packed seating arrangements.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a headrest with an integrated entertainment may comprise a headrest shell, a headrest mount allowing at least one degree of freedom in movement, a visor that may comprise at least one side arm and a display span, and a neutral position mechanism. The visor may be rotatably coupled to the headrest shell, the headrest may be coupled to the headrest mount, and the neutral position mechanism may support the headrest in a neutral position.

In some embodiments, the display span may comprise a retina display.

In certain embodiments, the display span may comprise an LCD display.

In some embodiments, the headrest mount may comprise a ball joint.

In certain embodiments, the headrest may further comprise at least one slot in the headrest shell and at least one axle on the at least one side arm of the visor. The at least one axle may be disposed through the at least one slot such that the visor may rotate about the at least one axle and the at least one axle may translate fore and aft through the at least one slot.

In some embodiments, the at least one slot may comprise at least one decent to hold the visor in a specified position.

In certain embodiments, the headrest may further comprise at least one friction bushing between the at least one axle and the at least one slot.

In some embodiments, the neutral position mechanism may comprise an elastic compression material. The elastic compression material may comprise a honeycomb material.

In certain embodiments, the headrest may further comprise an electric motor. The electric motor may rotate the visor from a stowed position to a deployed position.

In some embodiments, the headrest may further comprise a stowage slot in the headrest shell adapted to receive the visor in a stowed position.

In certain embodiments, the headrest mount may comprise flexible struts.

In some embodiments, the headrest may further comprise a sound system integrated with the headrest shell. The sound system may comprise headphones.

In certain embodiments, the headrest shell may comprise an inner headrest shell and an outer headrest shell.

In some embodiments, the visor may be stowed between the inner headrest shell and the outer headrest shell.

In certain embodiments, at least one speaker may be positioned between the inner headrest shell and the outer headrest shell.

According to certain embodiments of the present invention, a passenger seat may comprise a seat structure, a headrest that may comprise a headrest shell, a headrest mount allowing at least one degree of freedom, and a neutral position mechanism, and an integrated entertainment system that may comprise a visor, which may comprise at least one side arm and a display span. The at least one side arm may be rotatably coupled to the headrest shell, the headrest may be movably coupled to the seat structure through the headrest mount, and the neutral position mechanism may maintain a position of the headrest relative to the seat structure.

In some embodiments, the passenger seat may further comprise at least one slot in the headrest shell and at least one axle on the at least one side arm of the visor. The at least one axle on the at least one side arm of the visor may be disposed through the at least one slot in the headrest shell such that the at least one side arm of the visor may rotate about the at least one axle, and the at least one axle may translate fore and aft through the at least one slot.

According to certain embodiments of the present invention, a headrest may comprise a headrest shell that may comprise an inner shell and an outer shell, the outer shell may comprise a first slot and a second slot. The headrest may also comprise a headrest mount, which may comprise a ball joint, a neutral position mechanism that may comprise an elastic compression material, a first friction bushing, a second friction bushing, and a visor, which may comprise a first side arm that may comprise a first axle, a second side arm that may comprise a second axle, and a display span, and an integrated sound system that may comprise headphones. The first axle may be disposed through the first slot of the outer shell with the first friction bushing between the first axle and the first slot, and the second axle may be disposed through the second slot of the outer shell with the second friction bushing between the second axle and the second slot such that the first axle and the second axle may translate fore and aft within the first slot and the second slot. The visor may rotate about the first axle and the second axle between a deployed position and a stowed position that is between the inner shell and the outer shell, and the neutral position mechanism may maintain the headrest shell in a neutral position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a headrest with an integrated entertainment system. While the headrests are discussed for use with airline passenger seats, they are by no means so limited. Rather, embodiments of the headrest with an integrated entertainment system may be used in any passenger seat including, but not limited to, automotive, marine, bus, train, or other commercial passenger seats.

Figure 1:
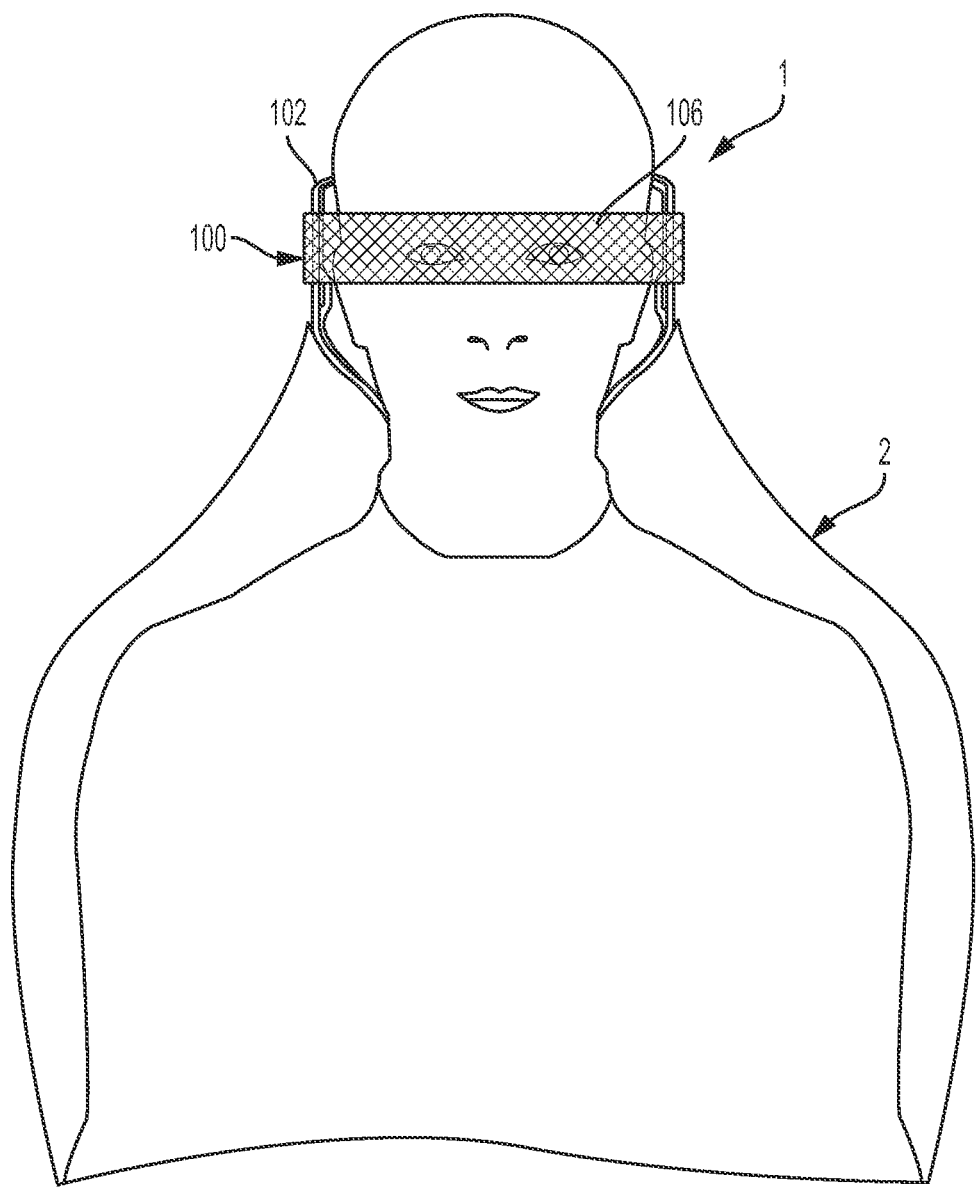
FIG. 1 is a front view of a headrest with an integrated entertainment system according to certain embodiments of the present invention.
Figure 2A:
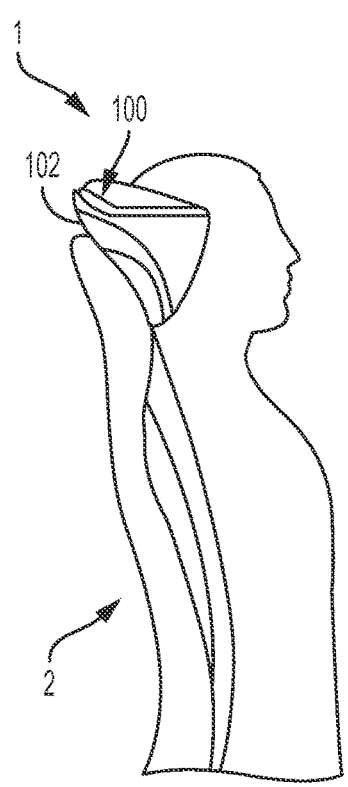
FIG. 2A is a side view of a headrest with an integrated entertainment system in a stowed position according to certain embodiments of the present invention.
Figure 2B:
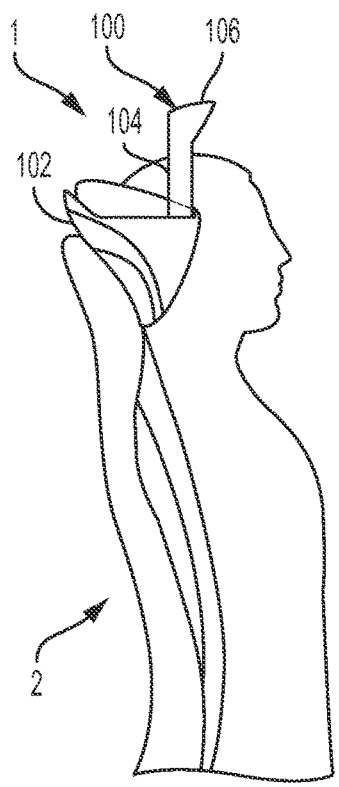
FIG. 2B is a side view of a headrest with an integrated entertainment system in an intermediate position according to certain embodiments of the present invention.
Figure 2C:
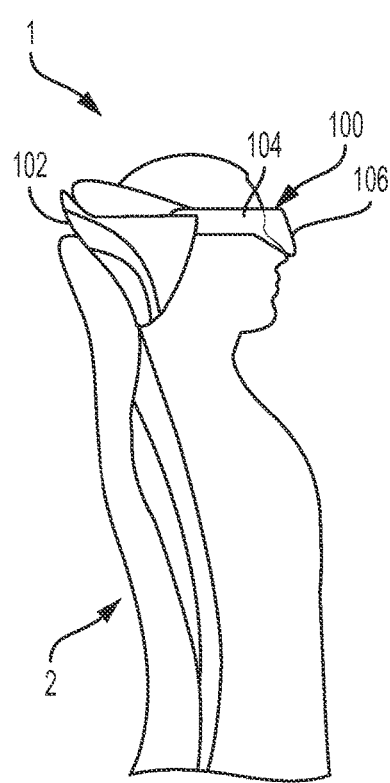
FIG. 2C is a side view of a headrest with an integrated entertainment system in a deployed position according to certain embodiments of the present invention.
Figure 3A:
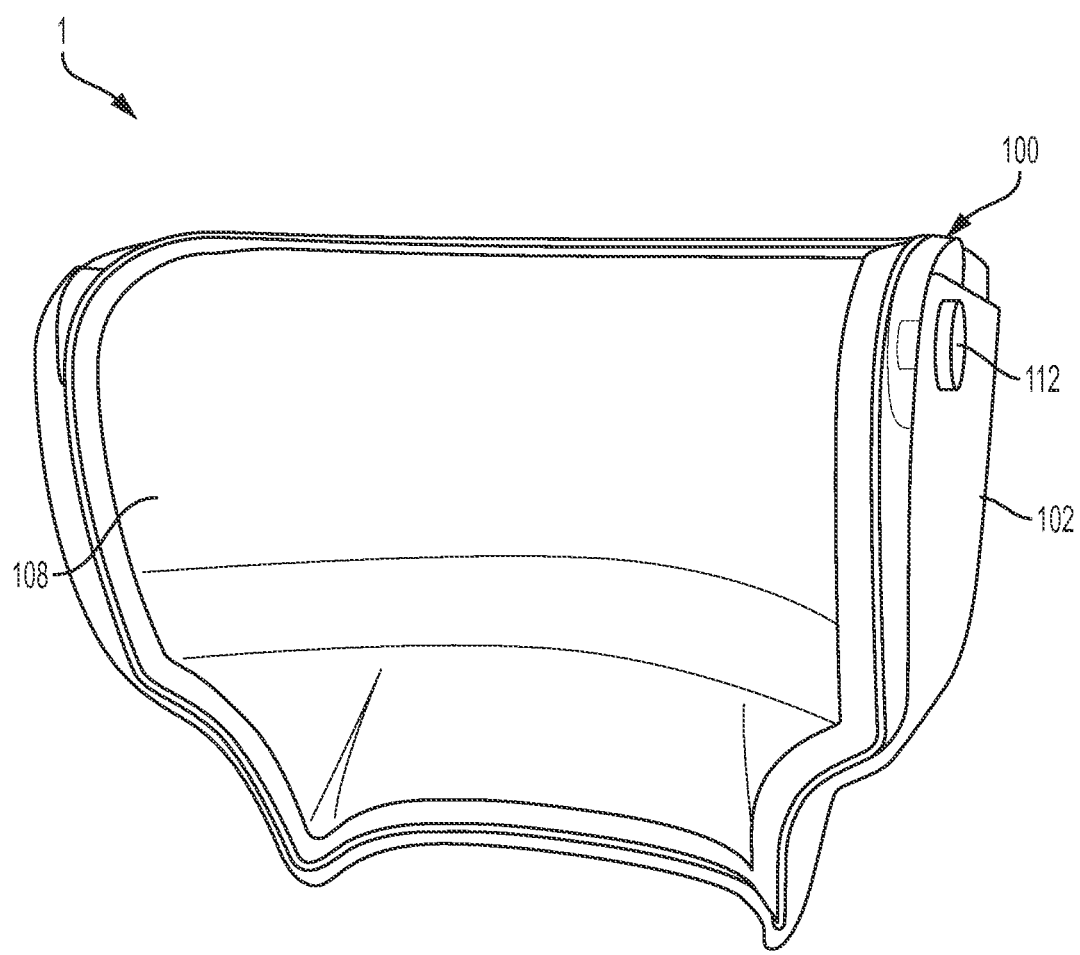
FIG. 3A is a front perspective view of a headrest with an integrated entertainment system in a stowed position according to certain embodiments of the present invention.
Figure 3B:
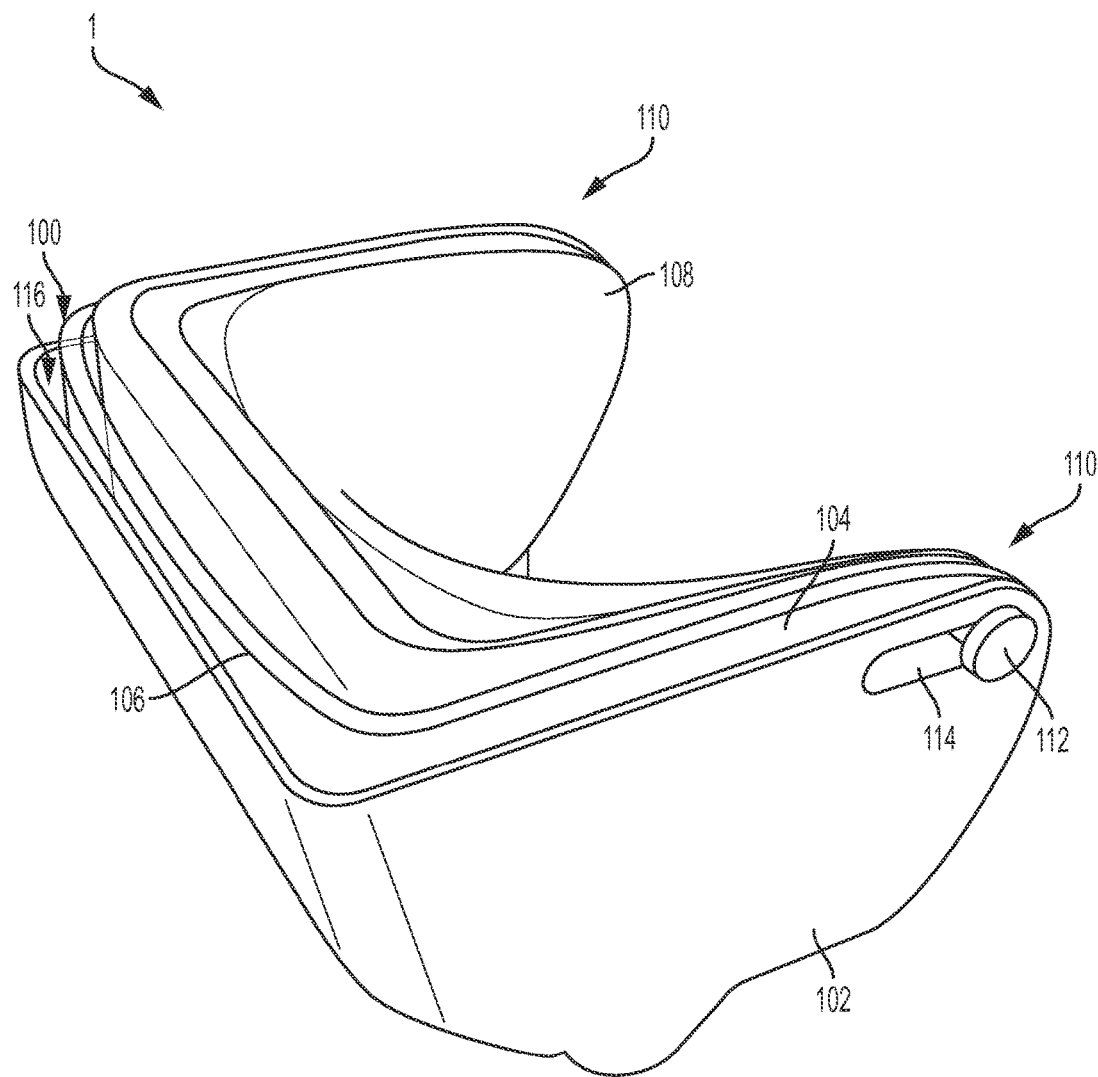
FIG. 3B is a rear perspective view of the headrest of FIG. 3A.
Figure 3C:
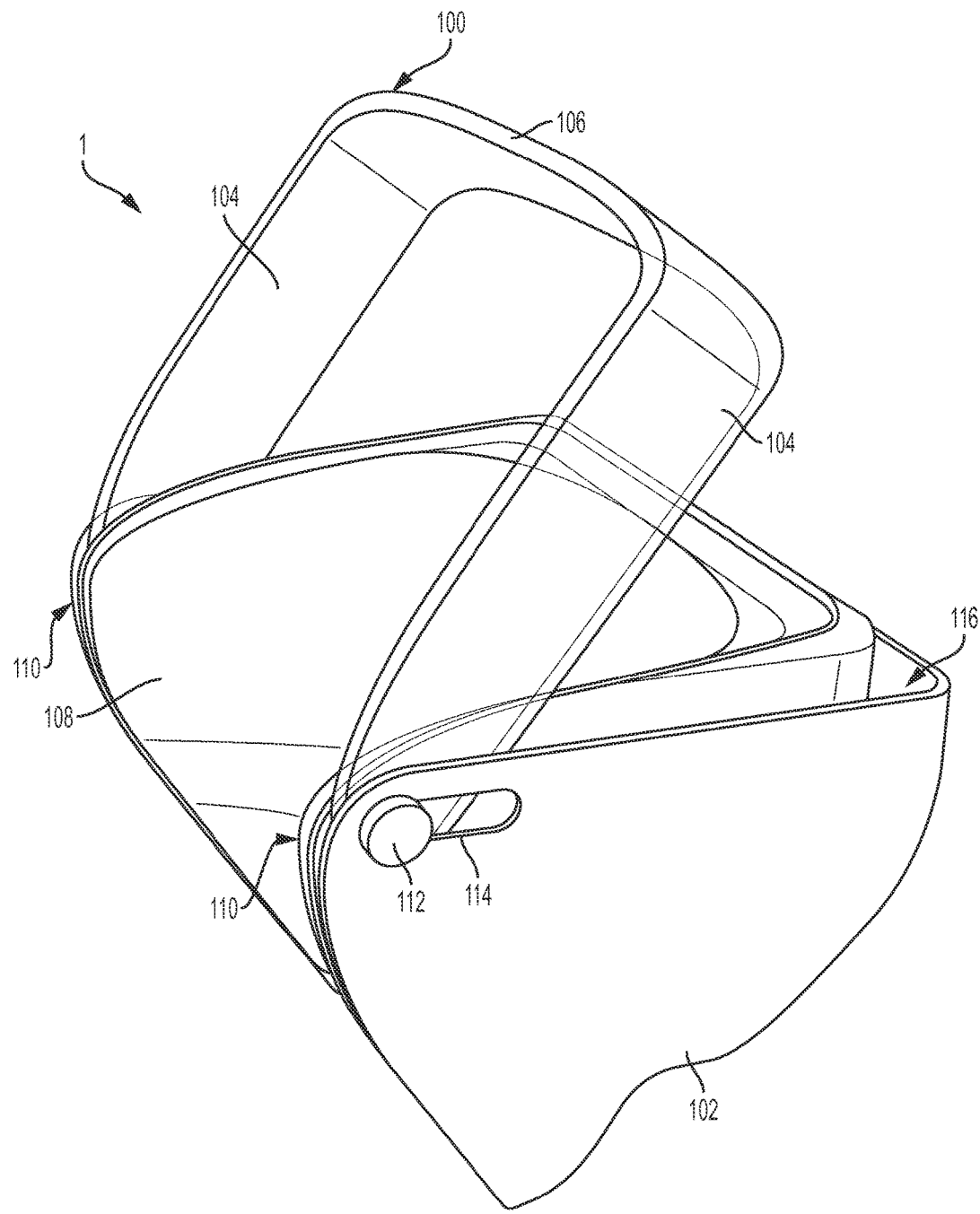
FIG. 3C is a perspective view of the headrest of FIG. 3A with the integrated entertainment system in an intermediate position.
Figure 3D:
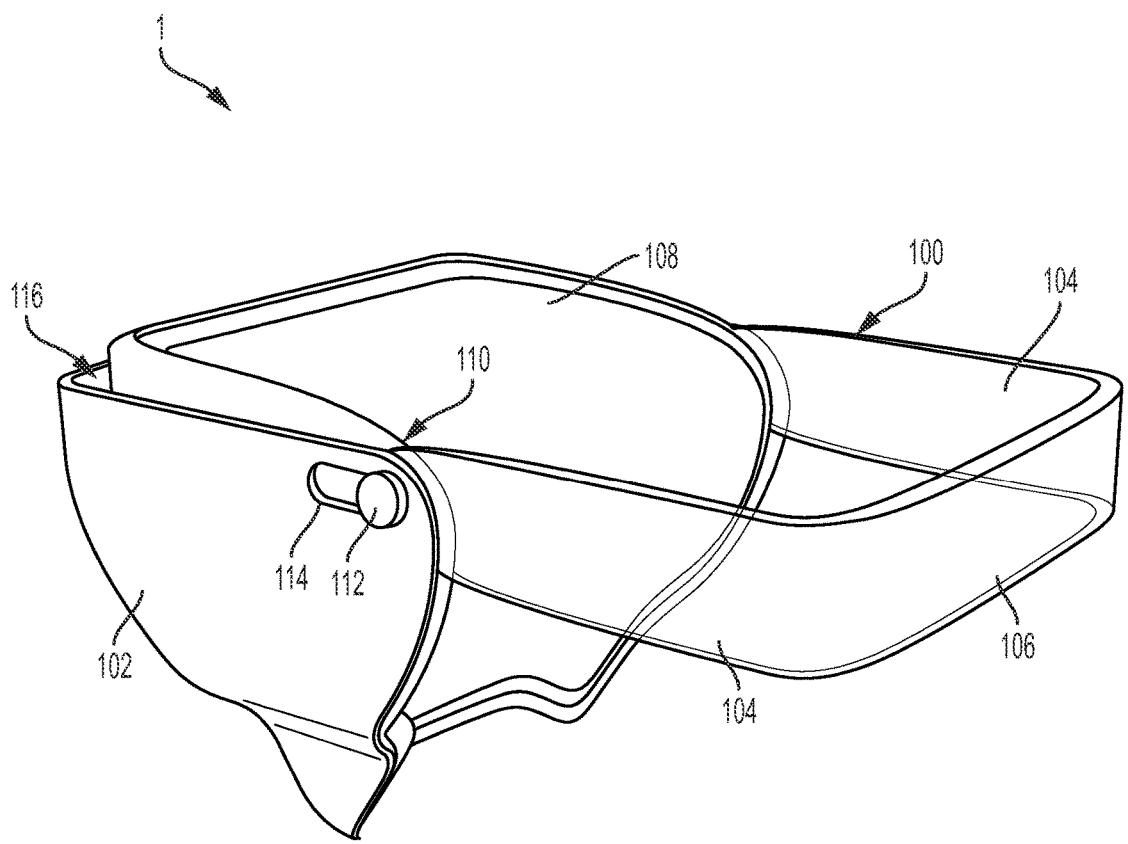
FIG. 3D is a front perspective view of the headrest of FIG. 3A with the integrated entertainment system in a deployed position.
Figure 3E:
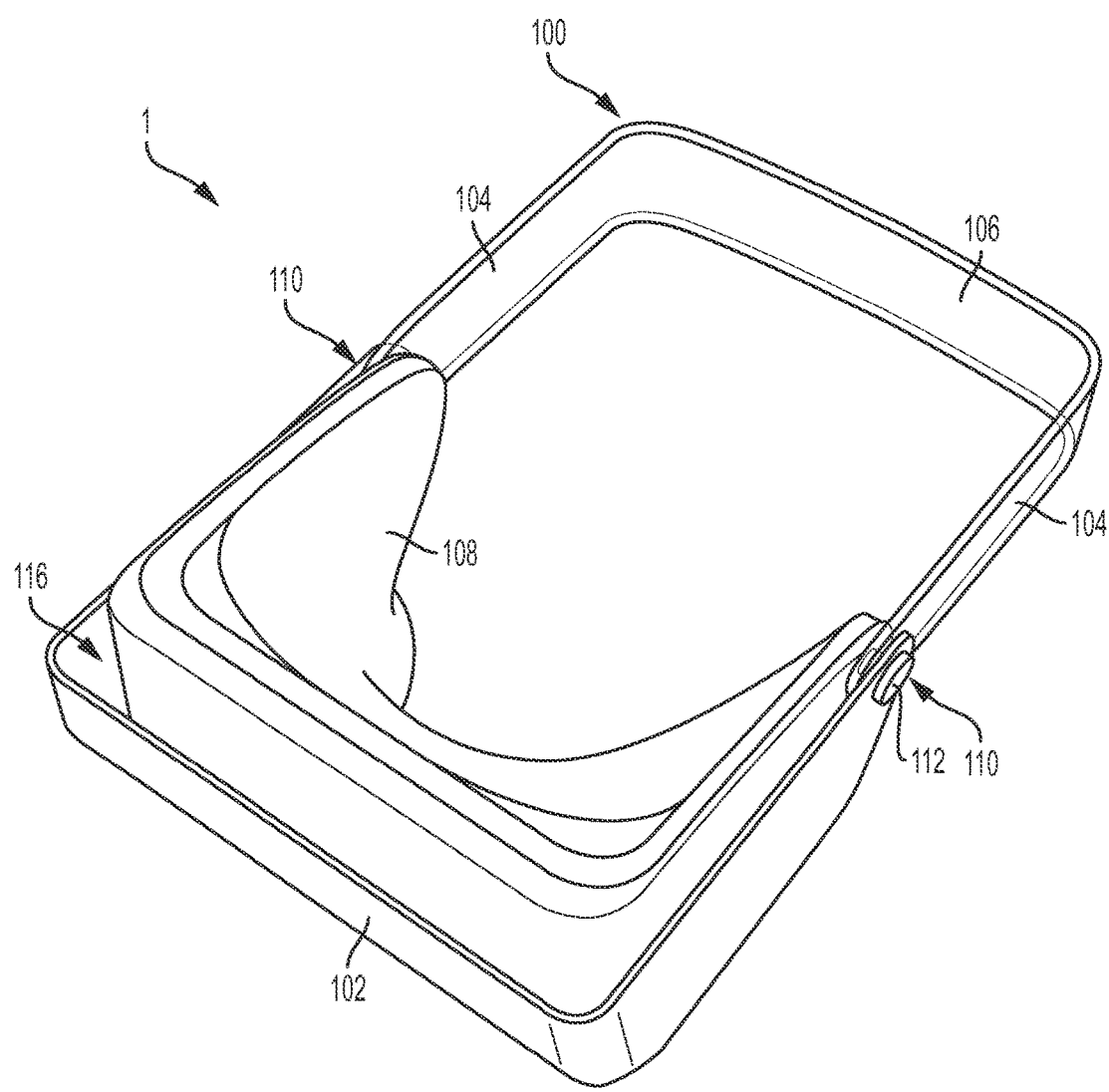
FIG. 3E is a top perspective view of the headrest of FIG. 3A with the integrated entertainment system in a deployed position.
Figure 3F:
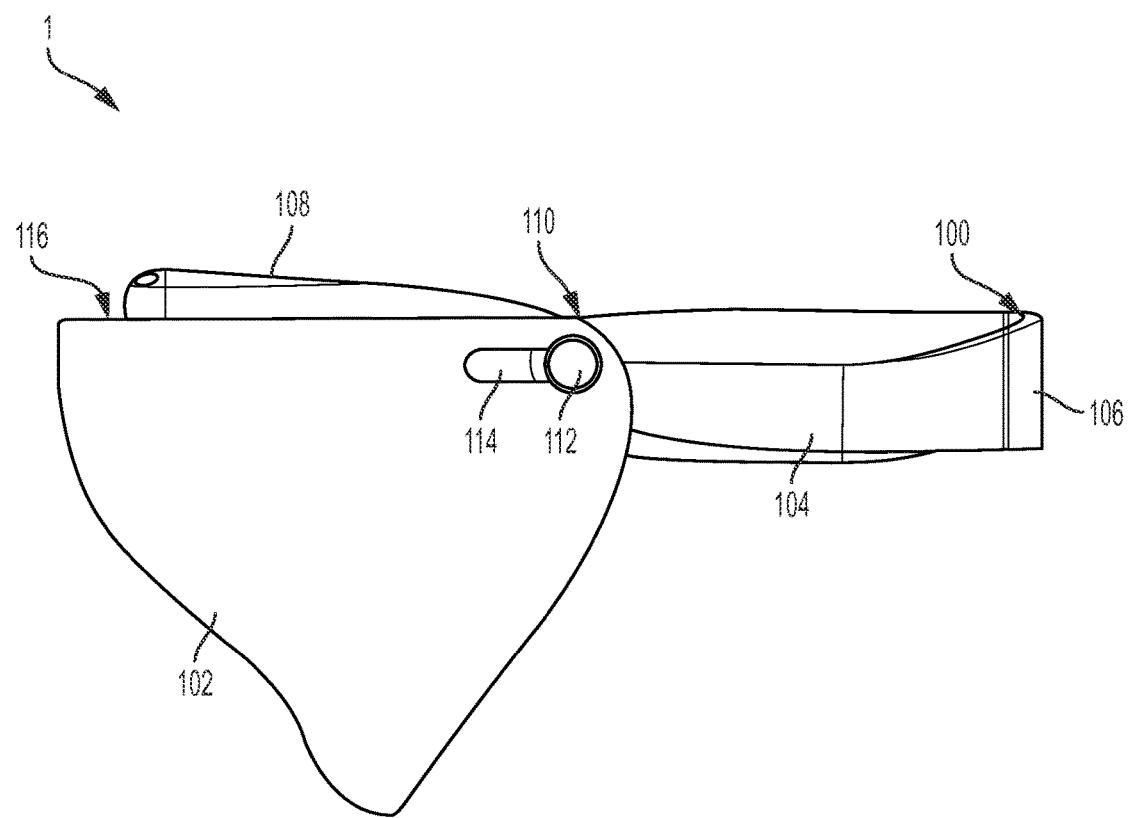
FIG. 3F is a side view of the headrest of FIG. 3A with the integrated entertainment system in a deployed position.

In some embodiments of the present invention, as shown in FIGS. 1-2C, a headrest 1 comprises a headrest shell 102 with a visor 100 that may include one or more side arms 104 and a display span 106. The headrest 1 may be mounted on a passenger seat 2 and positioned so as to support a passenger's head. The visor 100 may move between a stowed position (FIG. 2A), through an intermediate position (FIG. 2B) and into a deployed position (FIGS. 1 and 2C) where the visor 100 may be positioned such that the display span 106 is in the line of sight of a passenger's eyes or otherwise easily visible. The headrest 1, including the visor 100, may form all or part of an integrated entertainment system that allows a passenger to view the multimedia of his or her choice on the display span 106 of the visor 100 when the visor 100 is in the deployed position. When a passenger does not wish to view or experience any entertainment, the visor 100 may be put into a stowed position without impinging or interfering with the passenger's view. In addition, the visor 100 may provide a semi-immersive entertainment experience, allowing a passenger to focus on entertainment or multimedia without being disturbed or disrupted by the surrounding environment, but also preventing claustrophobia or discomfort from complete enclosure.

Still referring to FIGS. 1-2C, the headrest 1 and/or visor 100 may incorporate a number of technologies to display visual media. For example, the display span 106 of the visor 100 may include any number of display technologies including, but not limited to, LCD displays, individual eye displays, full-width displays, retina displays that project an image directly onto the retina of a passenger, and/or any other type of display technology that may be used to project a visible image to a viewer. The display span 106 may display still images, video, three-dimensional video, and/or holographic video from a variety of sources including analog or digital media, TCP/IP sources, user sources such as a cellular phone, computer, tablet computer, and/or data storage drive, or media that is provided by a carrier such as an airline. In certain embodiments, the visor 100 may have additional features or functions. For example, the visor 100 may have variable transparency to adjust the amount of light, and consequently the visibility of the surrounding environment to a passenger, that passes through the visor 100. The visor 100 may also be configured with small lights or an external display to show messages on its exterior surface to provide information to other passengers or personnel. For example, LED lights or messages may be displayed on the exterior surface of the visor 100 to indicate that a passenger does not wish to be disturbed, or that he or she would like a beverage or other service.

The headrest 1 with an integrated entertainment system may also incorporate additional features to provide a more engaging entertainment experience to a passenger. For example, the headrest 1 may include earphones or speakers, with or without noise cancelling technology, to provide sound to the passenger. In certain embodiments, the headrest 1 may pivot, rotate, and/or otherwise move with respect to the passenger seat 2. Independent motion of the headrest 1, in addition to providing additional adjustability and comfort to the passenger, frilly also allow for a consistent alignment of the passenger's eyes with the display span 106 of the visor 100 to maintain a consistent image. This may be especially useful in the case of a retina display that requires the display to be aligned with the eyes of a passenger to provide a clear, in focus image. Furthermore, in certain embodiments, the headrest 1 and/or visor 100 may incorporate motion sensing technology to detect the motion of the headrest 1 with respect to the passenger seat 2. The motion of a passenger's head, and the subsequent motion of the headrest 1, may then be used to maintain an optimal image on the display span 106 of the visor 100, or to allow a passenger to move or pan through a virtual reality or three-dimensional image. In some embodiments, motion tracking of the headrest 1 may be accomplished through gyroscopes, displacement sensors in the mount of the headrest 1, inertial sensors, and/or any other sensor as necessary for a particular application. Similarly, in certain embodiments, the headrest 1 and/or visor 100 may incorporate eye tracking technology to determine the direction and focus of the passenger's eyes with respect to the visor 100 and/or display span 106. In some embodiments, the headrest 1 may include a remote control to allow a passenger to control the headrest 1 and any associated entertainment functions. In certain embodiments, the motion of the visor 100 may be manual or electronically controlled as with electric motors or other actuators.

FIGS. 3A-3F are views of an exemplary embodiment of a headrest 1 with visor 100 in stowed (FIGS. 3A and 3B), intermediate (FIG. 3C), and deployed (FIGS. 3D-3F) positions. The headrest 1 may comprise a headrest shell 102 with a lining 108 that may be a cushion, foam, or other comfortable material, and a stowage slot 116 for receiving the visor 100 in a stowed position. The visor 100 may include one or more side arms 104 that support a display span 106. Each side arm 104 may include an axle 112 that is configured to mate with an adjustment slot 114 in the headrest shell 102 of the headrest 1 to form a hinge or joint 110. As shown, the visor 100 includes two side arms 104 to form a wraparound visor 100. However, in certain embodiments, the visor 100 may have only a single side arm 104 that supports the display span 106.

The headrest 1 may be shaped to ergonomically support the head and neck of a passenger to provide comfort and to align the passenger's head and eyes with the visor 100 for an optimal entertainment experience. For example, in certain embodiments, the design of the headrest 1 and/or headrest shell 102 may be configured such that the passenger's head is fully supported and/or aligned with the visor 100 and/or any speakers or headphones. In some embodiments, the headrest 1 may be used with a neck support (not shown) that may be adjustable or stowable to allow for fitment to a wider variety of passengers.

Still referring to FIGS. 3A-3F the joint 110 allows the visor 100 to rotate about the axles 112 and to translate fore and aft through the adjustment slots 114 to allow the visor 100 to move from a stowed position through an intermediate position and into a deployed position. The adjustment slots 114 allow the axles 112, and thus the visor 100, to translate fore and aft with respect to the headrest shell 102. The fore and aft adjustment of the visor 100 allows the distance from the display span 106 to a passenger's eyes to be adjusted to allow the visor 100 to be correctly positioned relative to wide range of passengers of differing shapes and sizes. For example, the fore and aft translation of the visor 100 may allow the visor 100 to clear a passenger's head, face, and/or glasses as it moves from a stowed to a deployed position. Furthermore, in a deployed position, the visor 100 may be adjusted fore and aft to provide the passenger with a comfortable fit, and to allow adjustment of the focal length from the display span 106 to the passenger's eyes. In certain embodiments, particularly those that may incorporate a retina display that projects an image directly onto the retina of a passenger, maintaining the proper distance between the passenger's eyes and the display span 106 of the visor 100 is necessary to provide clear, focused images from the display span 106. The fore and aft adjustability of the visor 100 may also allow for more compact packaging of the visor 100, headrest shell 102, and/or stowage slot 116. For example, when the visor 100 moves between a stowed position in the stowage slot 116 and a deployed position, the visor 100 may both rotate about the axles 112 and translate through the adjustment slots 114. The combined rotating and translating motion may allow the visor 100 to provide adequate clearance to the passenger with shorter side arms 104, giving a more compact and easily stowed visor 100 design.

The joint 110 may incorporate additional features to modify or adjust the motion of the visor 100 from a stowed position in the stowage slot 116 to a deployed position in front of the passenger's eyes. For example, the joint 110 may include regulating mechanisms to provide more controlled motion of the visor 100 even in cases of a rough ride, turbulence, or other conditions that may cause sudden, undesirable movement of the visor 100. In certain embodiments, the joint 110 may incorporate friction bushings or other resistance mechanisms that may slow the motion of the visor 100 and/or hold the visor 100 in position unless an outside force, such as the passenger pushing on the visor 100, overcomes the friction or resistance. In some embodiments, the joint 110 may include detents, ratcheting mechanisms, or other indexing mechanisms for holding the visor 100 at discrete locations, angles, or orientations between the stowed and fully deployed positions. In certain embodiments, the regulating mechanisms may only operate in one direction of motion of the visor 100, or only at certain points along the range of motion of the visor 100. For example, the regulating mechanisms may provide damping, friction, indexing, or any other control over the motion of the visor 100 near the deployed and/or stowed positions, while allowing free movement through the intermediate positions. The joint 110 may also include end stops to prevent the visor 100 from exceeding its intended range of motion. In certain embodiments with powered deployment and/or stowage of the visor 100, the electric motors and/or actuators that control the motion of the visor 100 may provide the locating, indexing, and motion regulation functions over the joint 110. Location, indexing, and/or motion regulating functions may be from the design of the power train for the powered deployment and/or stowage system, such as gearing systems, clutches, or other mechanical components, or from the resistance or locking of the electric motors and/or actuators themselves.

As shown, the visor 100 articulates and rotates above the head of a passenger to move between stowed and deployed positions. However, in certain embodiments, the visor 100 may rotate from a stowed position in the side of the headrest shell 102. A side-deploying visor 100 may be flexible, or otherwise shaped to allow it to stow within the side of the headrest shell 102 while still providing adequate clearance and adjustability to provide an in-focus, high-quality viewing experience.

Figure 4:
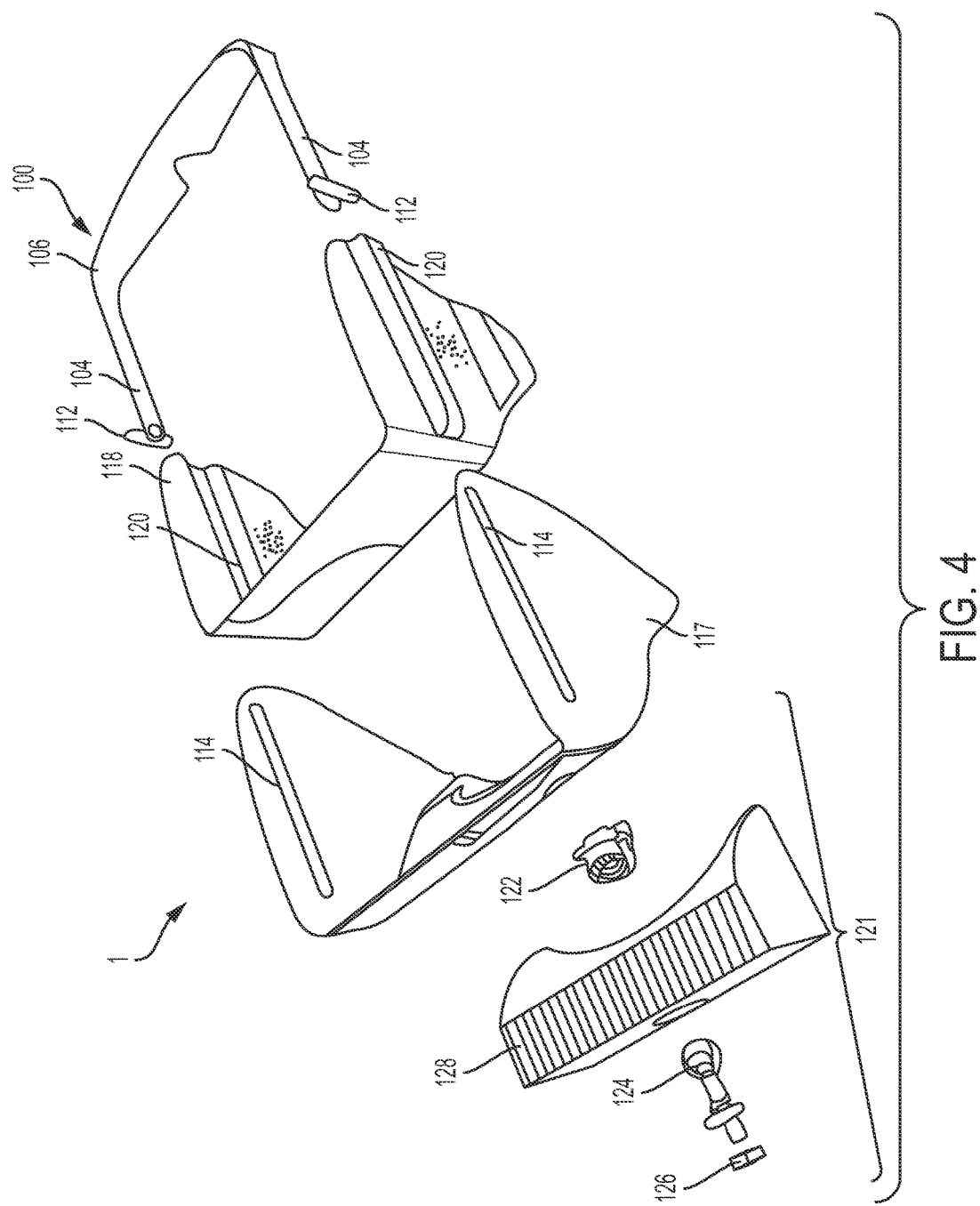
FIG. 4 is an assembly view of a headrest with an integrated entertainment system according to certain embodiments of the present invention.

FIG. 4 is an assembly view of an exemplary embodiment of a headrest 1 with an integrated entertainment system and its associated mounting hardware. The headrest 1 assembly may comprise an outer shell 117 with adjustment slots 114 and an inner shell 118 with an optional spacing rib 120. A visor 100 may include one or more side arms 104 that support a display span 106 and terminate in one or more axles 112 adapted to engage the adjustment slots 114 on the outer shell 117 of the headrest 1. The headrest 1 assembly may also include a coupling 121 comprising a socket 122 adapted to mate with a ball 124 to form a ball joint, and a nut 126 to affix the ball joint to the seat (not shown). The headrest 1 assembly may also include a neutral position mechanism 128 to locate and stabilize the headrest 1 in a neutral position and provide resistance and re-positioning of the headrest 1 when it is displaced out of its neutral position.

As shown, the inner shell 118 may nest within the outer shell 117. The inner shell 118 may include one or more optional spacing ribs 120 that are configured to provide structure and support to the assembled headrest 1, and may also provide spacing between the inner shell 118 and outer shell 117 to give clearance to headphones, speakers, wiring, other electronic components, electric motors or actuators, or any other mechanisms or devices that tray be included with the headrest 1 or its integrated entertainment system. The spacing between the inner shell 118 and outer shell 117 may also be used to enhance the acoustics of any integrated speakers and/or headphones, or to allow airflow for cooling of electronic components. In certain embodiments, the spacing between the inner shell 118 and outer shell 117 may be used to form a stowage slot 116 (not shown) to hold the visor 100 in a stowed position.

Still referring to FIG. 4, the headrest 1 may be coupled or otherwise attached to a seat or seal flame through a coupling 121 that may comprise a joint and a neutral position mechanism 128. As shown, the coupling 121 may include a socket 122 adapted to mate with a ball 124 to form a ball joint that allows for pivoting and rotating of the headrest 1 with respect to a seal or seat flame that the headrest 1 is coupled with. In certain embodiments, the coupling 121 may be a series of hinges, flexible attachment struts, a universal joint, or any other mechanism that allows at least one degree of freedom of movement between the headrest 1 and the passenger seat 2 (not shown). The coupling 121 may also include an optional neutral position mechanism 128 that locates the headrest 1 in a neutral unloaded position. The neutral position mechanism 128 may provide resistance to movement between the headrest 1 and the passenger seat 2 and a reactive force to return the headrest 1 to the neutral position after it has been displaced. As shown in FIG. 4, the neutral position mechanism may comprise a material that undergoes elastic compression, such as, but not limited to, a cellular material, foam, rubber, or other elastomers. In certain embodiments, the neutral position mechanism 128 may comprise a honeycomb of silicone, rubber, or another resilient material that may deflect in response to a force, but return to its original shape under repeated cycles of use. The coupling 121 in combination with the neutral positioning mechanism 128 allows the headrest 1 to move relative to the passenger seat 2, allowing a passenger to move his or her head while still providing support and a re-centering action to return the headrest 1 to its original position.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some, features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A headrest with integrated entertainment comprising:
   a headrest shell;
   a headrest mount allowing at least one degree of freedom in movement;
   a visor comprising at least one side arm and a display span;
   a stowage slot in the headrest shell adapted to receive the visor in a stowed position; and
   a neutral position mechanism,
   wherein the visor is rotatably coupled to the headrest shell and the neutral position mechanism supports the headrest in a neutral position.

2. The headrest of claim 1, wherein the display span comprises a retina display.

3. The headrest of claim 1, wherein the display span comprises an LCD display.

4. The headrest of claim 1, wherein the headrest mount comprises a ball joint.

5. The headrest of claim 1, further comprising:
   at least one slot in the headrest shell; and
   at least one axle on the at least one side arm of the visor,
   wherein the at least one axle is disposed through the at least one slot such that the visor may rotate about the at least one axle and the at least one axle may translate fore and aft through the at least one slot.

6. The headrest of claim 5, wherein the at least one slot comprises at least one detent to hold the visor in a specified position.

7. The headrest of claim 5, further comprising at least one friction bushing between the at least one axle and the at least one slot.

8. The headrest of claim 1, wherein the neutral position mechanism comprises an elastic compression material.

9. The headrest of claim 8, wherein the elastic compression material comprises a honeycomb material.

10. The headrest of claim 1, further comprising an electric motor, wherein the electric motor rotates the visor from the stowed position to a deployed position.

11. The headrest of claim 1, further comprising a sound system integrated with the headrest shell.

12. The headrest of claim 11, wherein the sound system comprises headphones.

13. The headrest of claim 1, wherein the headrest shell comprises an inner headrest shell and an outer headrest shell.

14. The headrest of claim 13, wherein the visor is stowed between the inner headrest shell and the outer headrest shell.

15. The headrest of claim 13, wherein at least one speaker is positioned between the inner headrest shell and the outer headrest shell.

16. A headrest comprising:
a headrest shell comprising an inner shell and an outer shell, the outer shell comprising a first slot and a second slot;
a headrest mount comprising a ball joint;
a neutral position mechanism comprising an elastic compression material;
a first friction bushing and a second friction bushing;
a visor comprising a first side arm comprising a first axle, a second side arm comprising a second axle, and a display span; and
an integrated sound system comprising headphones,
wherein the first axle is disposed through the first slot of the outer shell with the first friction bushing between the first axle and the first slot, and the second axle is disposed through the second slot of the outer shell with the second friction bushing between the second axle and the second slot, such that the first axle and the second axle may translate fore and aft within the first slot and the second slot and the visor may rotate about the first axle and the second axle between a deployed position and a stowed position that is between the inner shell and the outer shell, and the neutral position mechanism maintains the headrest shell in a neutral position.

17. A headrest with integrated entertainment comprising:
a headrest shell comprising an inner headrest shell and an outer headrest shell;
a headrest mount allowing at least one degree of freedom in movement;
a visor comprising at least one side arm and a display span; and
a neutral position mechanism, wherein:
the visor is rotatably coupled to the headrest shell and the neutral position mechanism supports the headrest in a neutral position; and
the visor is stowed between the inner headrest shell and the outer headrest shell.

18. The headrest of claim 17, wherein the display span comprises at least one selected from the group of a retina display and an LCD display.

19. The headrest of claim 17, further comprising:
at least one slot in the headrest shell; and
at least one axle on the at least one side arm of the visor,
wherein the at least one axle is disposed through the at least one slot such that the visor may rotate about the at least one axle and the at least one axle may translate fore and aft through the at least one slot.

20. The headrest of claim 17, further comprising an electric motor, wherein the electric motor rotates the visor from a stowed position to a deployed position.

* * * * *